(12) United States Patent
Slatcher et al.

(10) Patent No.: US 12,523,496 B2
(45) Date of Patent: Jan. 13, 2026

(54) SENSOR SYNCHRONIZATION

(71) Applicant: Faro Technologies, Inc., Lake Mary, FL (US)

(72) Inventors: Neil Slatcher, Ruddington (GB); Cheryl Smith, Ruddington (GB)

(73) Assignee: FARO Technologies, Inc., Lake Mary, FL (US)

( * ) Notice: Subject to any disclaimer, the term of this patent is extended or adjusted under 35 U.S.C. 154(b) by 1045 days.

(21) Appl. No.: 17/612,801

(22) PCT Filed: May 18, 2020

(86) PCT No.: PCT/GB2020/051208
§ 371 (c)(1),
(2) Date: Nov. 19, 2021

(87) PCT Pub. No.: WO2020/234575
PCT Pub. Date: Nov. 26, 2020

(65) Prior Publication Data
US 2022/0244072 A1     Aug. 4, 2022

(30) Foreign Application Priority Data
May 20, 2019   (GB) .................................... 1907064

(51) Int. Cl.
*G01C 21/00*      (2006.01)
*G01C 21/16*      (2006.01)
(Continued)

(52) U.S. Cl.
CPC ..... *G01C 21/3848* (2020.08); *G01C 21/1652* (2020.08); *G01S 7/497* (2013.01);
(Continued)

(58) Field of Classification Search
None
See application file for complete search history.

(56) References Cited

U.S. PATENT DOCUMENTS 5,272,344 A  * 12/1993  Williams  ............... A61B 6/037
                                                      250/252.1
9,784,837 B1 * 10/2017  Olsson  .................. G01S 3/7862
(Continued)

FOREIGN PATENT DOCUMENTS

CA       3122654 A1    11/2020
EP       3705844 A1     9/2020
(Continued)

OTHER PUBLICATIONS

International Search Report and Written Opinion mailed Sep. 14, 2020 for International Patent Application No. PCT/GB2020/051208 (10 pages).
(Continued)

*Primary Examiner* — Helen Zong
(74) *Attorney, Agent, or Firm* — McCarter & English, LLP; Dave S. Christensen

(57) ABSTRACT

The disclosure relates to a simultaneous localisation and mapping, SLAM, device a data processing unit, computer program and associated method for receiving first-sensor-data, first-motion-data and first-timing-information associated with the first-sensor-data and the first-motion-data; receiving second-sensor-data, second-motion-data and second-timing-information associated with the second-sensor-data and the second-sensor-motion-data; and correlating the first-motion-data with the second-motion-data to identify a relationship between the first-timing-information and the second-timing-information, in which the identified relationship between the first-timing-information and the second-timing-information defines one or more associations between the first-sensor-data and the second-sensor-data.

16 Claims, 4 Drawing Sheets

(51) Int. Cl.
  *G01S 7/497* (2006.01)
  *G01S 17/42* (2006.01)
  *G01S 17/86* (2020.01)
  *G01S 17/87* (2020.01)
  *G01S 17/894* (2020.01)

(52) U.S. Cl.
  CPC .............. *G01S 17/42* (2013.01); *G01S 17/86* (2020.01); *G01S 17/87* (2013.01); *G01S 17/894* (2020.01)

(56) References Cited

U.S. PATENT DOCUMENTS

| | | | | |
|---|---|---|---|---|
| 2010/0204974 | A1* | 8/2010 | Israelsen | G01S 17/89 703/17 |
| 2013/0331972 | A1* | 12/2013 | Sagne | G06F 16/68 700/94 |
| 2017/0123066 | A1 | 5/2017 | Coddington et al. | |
| 2019/0356849 | A1* | 11/2019 | Sapienza | H04N 23/65 |
| 2021/0402539 | A1* | 12/2021 | Baratta | B23Q 3/15546 |

FOREIGN PATENT DOCUMENTS

| | | |
|---|---|---|
| GB | 2582266 A | 9/2020 |
| GB | 2584272 A | 12/2020 |

OTHER PUBLICATIONS

Examination Report mailed Aug. 1, 2023 for GB1907064.8 (3 pages).
Examination Report dated Jan. 17, 2023 for UK Patent Application No. GB1907064.8 (6 pages).
Canadian Office Action for Application No. 3,122,654, dated Jun. 30, 2025, 4 pages.
European Office Action for Application No. 20730687.9, dated Sep. 22, 2025, 6 pages.

* cited by examiner

SENSOR SYNCHRONIZATION

CROSS REFERENCE TO RELATED APPLICATIONS

This patent document is a 371 U.S. National Phase Patent Application of and claims the benefit of priority to International Patent Application No. PCT/GB2020/051208, filed on May 18, 2020, which claims the benefit of priority to United Kingdom Patent Application No. 1907064.8, filed on May 20, 2019. The entire contents of the before-mentioned patent applications are incorporated by reference as part of the disclosure of this application.

The disclosure relates to the field of synchronizing sensor datasets, and in particular, although not exclusively, relates to matching sensor-data to associated locations in three-dimensional map data.

BACKGROUND

Depth sensing device apparatuses are known for generating 3D-depth-maps.

Examples of such devices include a Light Detection and Ranging (Lidar) camera, stereoscopic camera or plenoptic camera. In some known systems, localization of the device may be achieved by moving the device to build up a 3D-map of its environment. Lidar data provides a depth map of a location in the form of a three-dimensional (3D) point cloud. Lidar-based Simultaneous Localization And Mapping (SLAM) systems enable 3D-map-data of an environment to be generated in a simple and efficient manner. To aid in the interpretation of 3D-map-data generated by SLAM devices, SLAM systems may be integrated with additional sensors to provide further context to the 3D data. In some examples, the sensor data captured by a separate sensor system are localised within the 3D-map-data generated by the SLAM device, enabling the user to view additional information that is referenced to specific locations within the 3D-map-data. Such a combined dataset may assist the user in interpreting the dataset, which corresponds to a real-world 3D environment.

However, known methods for localising sensor data in 3D-map-data have been found to suffer from a number of difficulties, such as increased computational complexity or requiring direct hardware interaction between, or compatibility of, the sensor system and the 3D-camera system.

SUMMARY

According to a first aspect of the disclosure there is provided a method comprising:

receiving first-sensor-data, first-motion-data and first-timing-information associated with the first-sensor-data and the first-motion-data;

receiving second-sensor-data, second-motion-data and second-timing-information associated with the second-sensor-data and the second-motion-data; and correlating the first-motion-data with the second-motion-data to identify a relationship between the first-timing-information and the second-timing-information, in which the identified relationship between the first-timing-information and the second-timing-information defines one or more associations between the first-sensor-data and the second-sensor-data.

The method may be computer-implemented. The first-sensor-data may be 3D-camera-data. The first-motion-data may be camera-motion-data. The first-timing-information may be camera-timing-information. The 3D-camera-data; camera-motion-data; and camera-timing-information may be obtained by, or relate to, a 3D-camera-device. The 3D-camera-device may be a SLAM system. The 3D-camera-data may be SLAM data. The 3D-camera-data or SLAM data may comprise position-data. The SLAM system may be configured to derive position-data. The position data may relate to a position of the SLAM system.

The first-motion-data and second-motion-data may each comprise acceleration-data. The motion-data may comprise one or more of data regarding a change in position over a period of time, a velocity, such as a linear or angular velocity, an acceleration, such as a linear or angular acceleration, an impulse or force. The motion-data may comprise one, two or three-dimensional data. The motion-data may correspond to one or more of: a change in displacement over time, a change in orientation over time and a change in acceleration. The change in displacement over time may comprise a change in displacement along the x, y or z axis or any combination thereof. The change in orientation over time may comprise a change in pitch, roll or yaw or any combination thereof. The change in acceleration may comprise a continuous or discontinuous change or any combination thereof. The first-motion-data and the second-motion-data may correspond to the same or different types of motion measurement, The 3D-camera-timing-information may be a timestamp, a sequence order or sequence number. The sensor-system-timing-information may be a timestamp, a sequence order or sequence number.

Correlating the first-motion-data with the second-motion-data may comprise identifying one or more features of the first-motion-data and similar respective one or more features of the sensor-motion-data. Correlating the first-motion-data with the second-motion-data may comprise deriving a time-offset between the first-timing-information and the second-timing-information based on the first-timing-information and the sensor-timing-information associated with the respective identified one or more features of the camera-motion-data and the similar respective one or more features of the sensor-motion-data.

The method may comprise iteratively adjusting a time difference, which may determine a degree of alignment, in the time domain, between the respective features of the first-motion-data and the second-motion-data in order to improve a correspondence between the one or more features of the first-motion-data and the similar respective one or more features of the second-motion-data. The time difference, or offset, may be derived from the time difference when the degree of mismatch is less than a threshold. The respective features may relate to one or more of a change in displacement over time, a change in orientation over time and a change in acceleration.

The method may comprise establishing, based on the identified relationship between the first motion-data and the second-motion-data, a common time frame for the first-timing-information and the second-timing-information to synchronise the first-sensor-data with the second-sensor-data.

The second-sensor-data may be one or more of the following: imaging-sensor-data. Radio frequency, RF-sensor-data, gas-sensors-data and temperature-sensor-data.

The method may comprise generating a combined dataset having the sensor-data and corresponding 3D-map-data with common timing information.

The 3D-map-data, camera-motion-data and camera-timing-information may be received from a 3D-camera-device. The sensor-data, sensor-motion-data and sensor-timing information may be received from a sensor-device. The sensor-device may be co-located with the 3D-camera-device. The method may comprise co-locating the first-device and the second device.

The 3D-camera-device may be a simultaneous localisation and mapping, SLAM, device.

According to various aspects of the disclosure, there is provided method comprising;
receiving three-dimensional, 3D, map-data, camera-motion-data and camera-timing-information associated with the 3D-map-data and the camera-motion-data;
receiving sensor-data, sensor-motion-data and sensor-timing-information associated with the sensor-data and the sensor-motion-data;
correlating the camera-motion-data with the sensor-motion-data to identify a relationship between the camera-timing-information and the sensor-timing-information, in which the identified relationship between the camera-timing-information and the sensor timing-information defines one or more associations between the sensor-data and the 3D-map-data.

According to a further aspect of the disclosure there is provided a data processing unit configured to perform any computer-implementable method described herein. The data processing unit may comprise one or more processors and memory, the memory comprising computer program code configure to cause the processor to perform any computer-implementable method described herein.

According to a further aspect of the disclosure there is provided a computer readable storage medium comprising computer program code configure to cause a processor to perform any computer-implementable method described herein. The computer readable storage medium may be a non-transitory computer readable storage medium.

According to a further aspect of the disclosure there is provided a simultaneous localization and mapping, SLAM, device, or other 3D-camera-device, comprising the data processing unit or the computer readable storage medium.

There may be provided a computer program, which when run on a computer, causes the computer to configure any apparatus, including a circuit, unit, controller, device or system disclosed herein to perform any method disclosed herein. The computer program may be a software implementation. The computer may comprise appropriate hardware, including one or more processors and memory that are configured to perform the method defined by the computer program.

The computer program may be provided on a computer readable medium, which may be a physical computer readable medium such as a disc or a memory device, or may be embodied as a transient signal. Such a transient signal may be a network download, including an Internet download. The computer readable medium may be a computer readable storage medium or non-transitory computer readable medium.

BRIEF DESCRIPTION OF FIGURES

Embodiments of the present invention will now be described by way of example and with reference to the accompanying drawings in which;

FIG. 2b illustrates a schematic plan view of a scene comprising the system of FIG. 2a;

DESCRIPTION OF EXAMPLES

Figure 1:
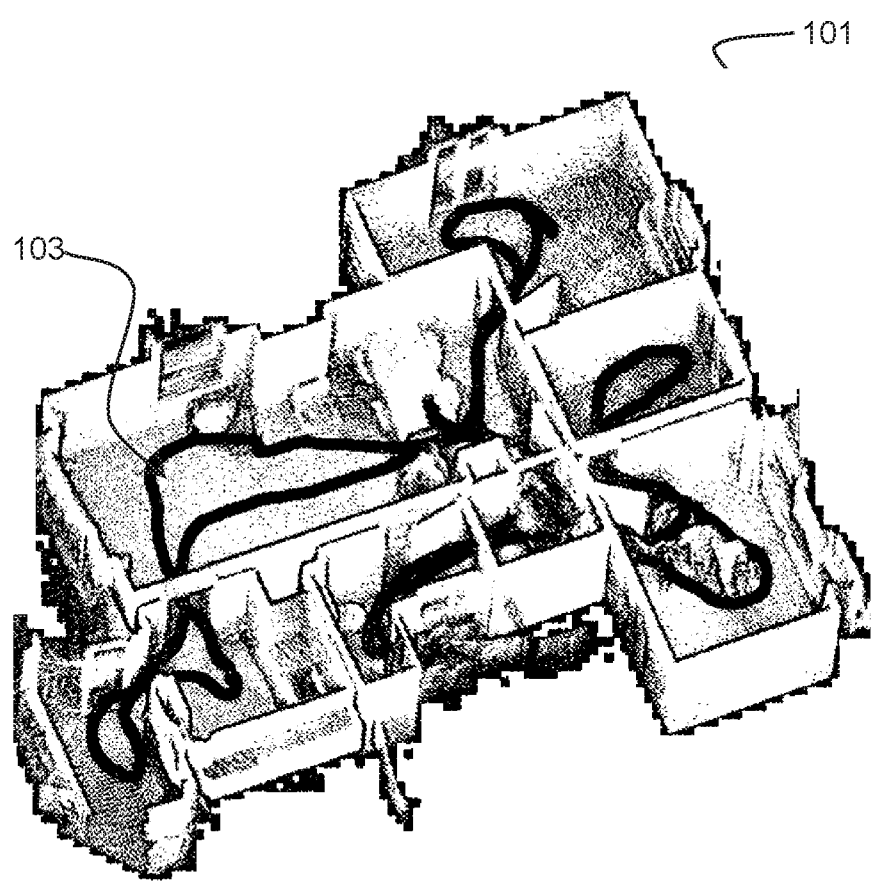
FIG. 1 illustrates an isometric perspective view of 3D-map-data obtained by a three-dimensional-camera.

Lidar-based Simultaneous Localization And Mapping (SLAM) systems enable 3D maps of an environment to be generated in a simple and efficient manner. FIG. 1 illustrates an isometric perspective view of a SLAM dataset 101 obtained by a SLAM device comprising a three-dimensional (3D)-camera, such as a Lidar camera.

The 3D-camera generates point-cloud data describing the environment in its field of view. The point-cloud data may be updated at a refresh rate of 100 Hz, for example. The SLAM dataset 101 is built up by the 3D-camera travelling within an environment, such as a building, underground mine or industrial facility, and constructing the dataset based on the point cloud data received as it moves. New point cloud data is referenced to the existing SLAM dataset in so that regions of the environment that have not been previously viewed can be added to the SLAM dataset 101.

In addition, a dataset generated by a SLAM device, such as ZEB-REVO® available from GeoSLAM Limited, may contain information that describes the location of the device through time within the 3D-map-data. That is, a profile of the movement of the device as a function of time. In this way, a route 103 of the device used to generate the SLAM dataset may be saved. Timing-information, which describes a system-time of the SLAM device, may be associated with each location on the route 103.

In many applications where SLAM systems are used, it may also be beneficial to capture additional information to enhance the 3D-map-data describing the environment and support further analysis, interpretation and management of the area-of-interest.

Any sort of sensor-data may supplement the 3D-data-map. For example, types of sensor data include images digital imagery, radio signal strength (e.g. WiFi or cellular telephone signal), gas concentrations (e.g. carbon monoxide) and thermometers. If captured at the same time as the 3D-data-map, and used in conjunction with the 3D-data-map, these additional sensor-data support further detailed assessment and management of the area-of-interest. Through mapping these additional datasets into the 3D data captured by the SLAM system, an improved 3D representation of the environment and the physical characteristics of the environment can be derived.

In some examples, the additional sensor-data may be provided by a system that is separate from the 3D-camera and therefore do not necessarily share a common time reference. For example, the sensor-device may be provided by a mobile telephone comprising a thermometer. To integrate 3D-map-data, such as a SLAM dataset, and sensor data such as those captured by an external sensor-device, a common time reference between the sensor-device and SLAM device must be established. This common time reference enables each datum of sensor data to be precisely located in the 3D-map-data. If the common reference time at which each image captured is known, then the location at which corresponding sensor data was captured can be derived through matching the time at which the sensor-data was obtained to the time (and thus 3D location) in the SLAM 3D map-data. This approach enables the 3D location at which corresponding sensor data was captured to be derived.

A challenging aspect of integrating a SLAM device and external sensor-data is establishing a common time reference between the external sensor-device and the SLAM device. It is common for SLAM devices and other sensor-devices to use different time references that do not directly correlate to one another. Establishing a common 'shared' time reference for the data captured from the SLAM system and the external sensor enables the data to be usefully integrated.

One approach to establish a common time reference requires either direct hardware synchronisation between the external sensor-device and SLAM system or complex manual post-processing of data streams to align both SLAM and sensor datasets. Such approaches impose significant limitations on the range of sensor-devices that can be used to capture digital images during SLAM data capture. Direct hardware synchronisation may require the sensor-device and SLAM device to share a common physical data communication interface that can be used to exchange suitable timing information. This requires that the SLAM device and sensor-device are both engineered to support this common interface.

A system, method and computer program that enable software-based synchronisation of various sensor-devices and a 3D-camera-devices are discussed below with reference to FIGS. 2a, 2b and 3 to 5. The approach used may enable sensor-data captured by the sensor-device 204 to be localised within the 3D-map-data generated by the 3D-camera-device 202 to provide additional contextual information for the 3D-map-data. In contrast to the examples discussed above, such an approach may not require hardware-based synchronisation of the 3D-camera-device and sensor-device.

Figure 2A:
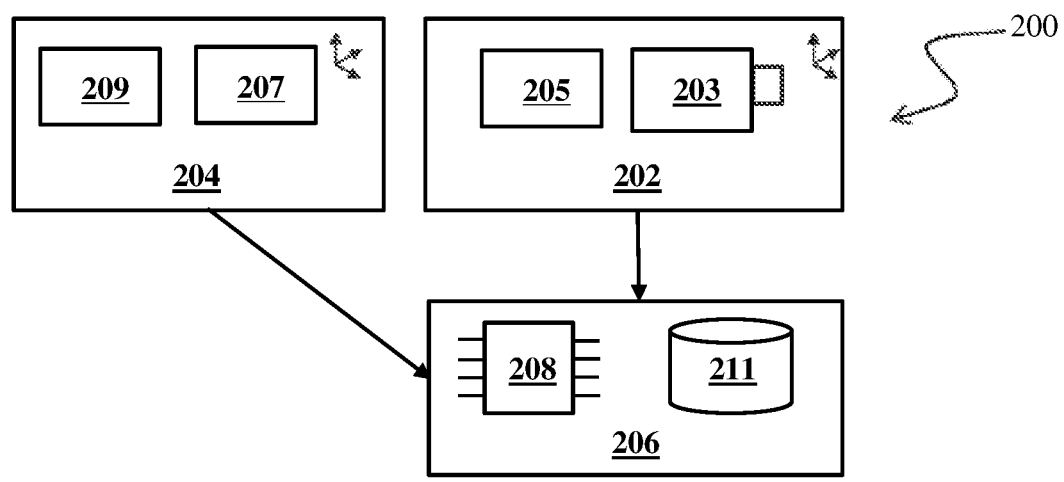
FIG. 2a illustrates a system comprising a 3D-camera, a sensor-device and a data processing unit.

FIG. 2a illustrates a system 200 comprising a three-dimensional (3D)-camera-device 202, a sensor-device 204 and a data processing unit 206. The 3D-camera 202 and sensor device 204 may be provided by separate devices.

The 3D-camera-device 202 may be provided by any depth sensing device apparatus, such as a SLAM system comprising a 3D camera 203 and a motion-sensor 205. The 3D-camera 203 may be a Light Detection and Ranging (Lidar) camera, stereoscopic camera or plenoptic camera, for example. The 3D-camera 203 is configured to capture 3D-map-data describing an environment in a field of view of the 3D-camera 203. For example, the 3D-camera 203 may be configured to obtain point-cloud data associated with its real-world location. The motion sensor 205 may be a 1D, 2D or 3D-accelerometer or gyroscope, for example. The motion-sensor 205 is configured to generate camera-motion-data, such as acceleration information. The 3D-camera-device 202 may be configured to determine its location at each point using SLAM techniques, as known in the art and described above with reference to FIG. 1. Camera timing-information is associated with each location at which the point-cloud data and camera-motion-data is obtained. The camera-timing-information may be a timestamp, a sequence order or sequence number, for example.

The sensor-device 204 may be a conventional consumer electronic device such as a mobile telephone or computer, for example. The sensor-device 204 comprises a motion-sensor 207 and another sensor 209. The motion-sensor 207 may be an 1D, 2D or 3D-accelerometer or gyroscope, for example. The motion-sensor 207 is configured to generate sensor-motion-data, such as acceleration information. Gyroscopic sensors typically generate measurements at data rates of between 100 Hz (100 measurements per second) and 500 Hz. By recording the angular rotation rates of the gyroscope sensors of the devices 202 and 204, a dataset can be generated that stores the angular rotation rate data of both devices at a high sampling frequency (100 Hz or greater). In some examples, the motion-sensor 207 of the sensor-device 204 is the same type of motion-sensor 205 of the 3D-camera-device 202.

The other sensor 209 may be any type of sensor and is configured to capture sensor-data. Sensor-timing-information is associated with each sensor reading. Like the camera-timing information, the sensor-timing-information may be a timestamp, a sequence order or sequence number. However, the sensor-timing-information is not necessarily of the same format as, or have any synchronization with, the camera-timing-information.

The 3D-camera-device 202 and the sensor-device 204 may be housed in separate devices. The 3D-camera-device 202 is not necessarily directly interoperable with the sensor-device 204. That is, the 3D-camera-device 202 and the sensor-device 204 may not be configured to exchange timing-information with one another.

The data processing unit 206 may be housed in a separate device to both the 3D-camera-device 202 and the sensor-device 204. Alternatively, the data processing unit 206 may be distributed amongst two or more devices. For example, some aspects of the tasks performed by the data processing unit 206 may be performed by the 3D-camera-device 202. Other aspects of the processing performed by the data processing unit 206 may be performed separately from the 3D-camera-device 202.

The data-processing-unit 206 is configured to receive the sensor-data and sensor-motion-data from the sensor-device 204 and configured to receive 3D-map-data and camera motion-data from the 3D-camera-device 202. The data may be communicated wirelessly or by a wired connection between the 3D-camera-device 202, sensor-device 204 and data processing unit 206. Such communication may be achieved via conventional means using methods known in the art. For example, a transfer of the sensor-data from the sensor-device 204 to the data-processing-unit 206 may be achieved using a removable memory card or Bluetooth™.

In some examples, the data processing unit 206 may comprise appropriate conventional hardware, including one or more processors 208 and memory 211 comprising computer program code configured to cause the processor(s) 208 to perform a method as described below with reference to FIG. 4.

Figure 2B:
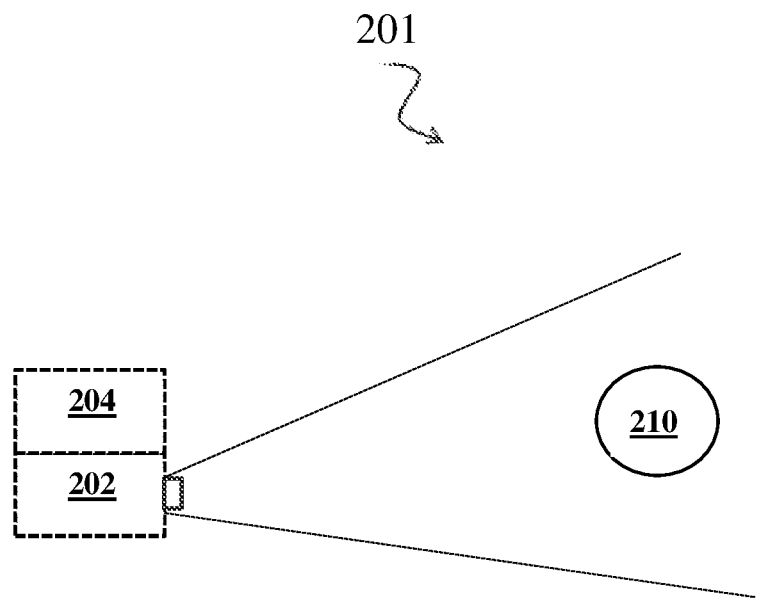

FIG. 2b illustrates a schematic plan view of an environment 201 at a real-world location comprising a 3D-camera-device 202, a sensor-device 204 and an object 210.

The 3D-camera-device 202 is co-located with the sensor-device-device 204. That is, the 3D-camera-device 202 and the sensor-device-device 204 are in substantially the same location. In this way, sensor-data may be obtained by the sensor-device 204 that correspond to locations in the 3D-map-data obtained by the 3D-camera-device 202.

In this example, the 3D-camera-device 202 is a separate device from, but physically connected or attached to, the 3D-camera-device 204. In this way, a known correspondence between sensor-data and 3D-map-data may be reproducible at different points in time. In some examples, a housing of the 3D-camera device 202 may be configured to be detachably coupled to a housing of the sensor-device device 204. In some examples, the housing of the 3D-camera-device 202 may comprise a docking station for removably mounting the sensor-device-device 204, using an industry standard connection such as micro-USIB, for example.

The 3D-camera-device 202 may be carried by a user or mounted on a vehicle, such as a land vehicle, aircraft or watercraft. A user may capture data by walking or travelling around with a 3D-camera-device 202 and sensor-device 204.

The location at which each datum was captured may then be identified using a software-based synchronisation approach to establish a common time reference between the sensor-device 204 and the 3D-camera-device 202, as described below with reference to FIG. 4. This enables the sensor-data to be localised within the 3D-map-data. This approach may enable greater flexibility in the selection of an appropriate sensor-device by the end user. The choice of sensor-device is not necessarily limited to devices that implement a hardware-based interface between the 3D-camera-device 202 and sensor-device 204.

Figure 3:
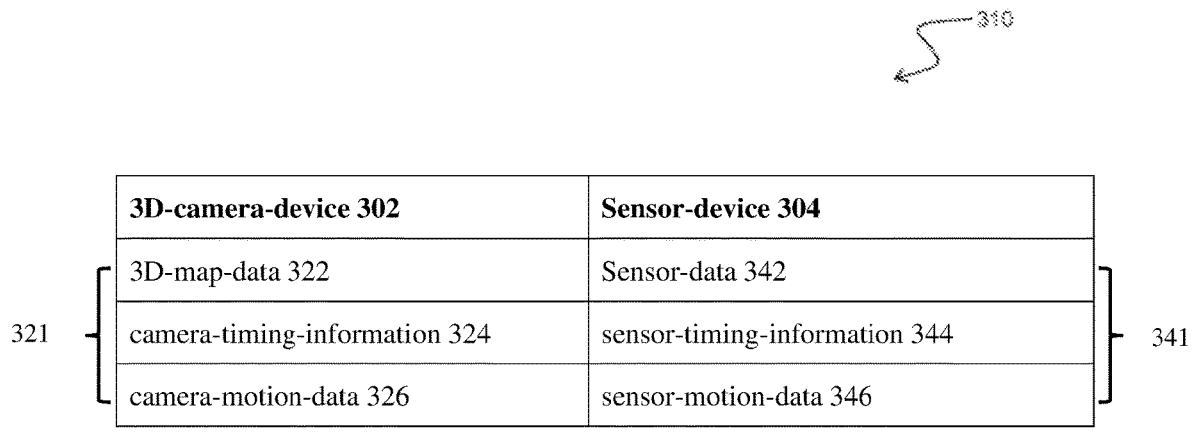
FIG. 3 provides a table of data generated by a sensor-device and a 3D-camera device such as those described previously with reference to FIGS. 2a and 2b.

FIG. 3 provides a table 320 of data generated by a sensor-device 304 and a 3D-camera device 302 such as those described previously with reference to FIGS. 2a and 2b. The 3D camera-device 302 is configured to collect a 3D-camera-data-set 321. The 3D-camera data-set 321 comprises 3D-map-data 322 that is associated with corresponding camera timing-information 324. The 3D-camera-data-set 321 also comprises camera-motion-data 326 that is also associated with the camera-timing-information 324.

The sensor-device 304 is configured to collect a sensor-data-set 341. The sensor-data set 341 comprise sensor-data 342 that is associated with corresponding sensor-timing information 344. The sensor-data-set 341 also comprises sensor-motion-data 346 that is also associated with the sensor-timing-information 344.

The camera-timing-information 324 is not necessarily synchronised with, or even of the same format as, the sensor-timing-information 344. However, if the 3D-camera-device 302 is suitably co-located with the sensor-device 304, the camera-motion-data 326 of the 3D-camera-device 302 may correspond to the sensor-motion-data 346 of the sensor-device 304 such that the camera-timing-information 324 may be synchronised with the sensor timing-information 344. In this way, the sensor-data 342 may be associated with corresponding 3D-map-data 322 without a priori synchronisation of the camera and sensor timing-information 324, 344.

It has also been recognised that such a synchronization method may be applied generally between a plurality of sensor-devices which also collect motion information. In such cases, the 3D-camera-device 302 may instead be replaced by a first-sensor-device and the sensor device 304 may be a second-sensor-device.

Figure 4:
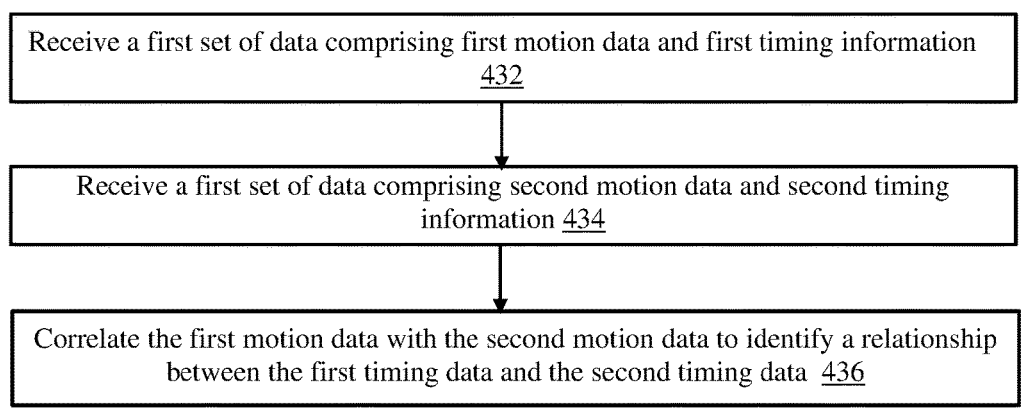
FIG. 4 illustrates a method for matching sensor-data to associated three dimensional-depth-map locations.

FIG. 4 illustrates a method 430 for matching first-sensor-data to associated second sensor-data. The method may be computer-implemented by, for example, the data processing device described previously with reference to FIGS. 2a and 2b.

The method 430 comprises receiving 432 a first set of data. The first set of data comprises: first-sensor-data, first-motion-data and first-timing-information. The first-timing-information is associated with the first-sensor-data and the first-motion-data.

The method 430 also comprises receiving 434 a second set of data. The second set of data comprises: second-sensor-data, second-motion-data, and second timing-information. The second-timing-information is associated with the second-sensor data and the second-sensor-motion-data. The first data set may be received before, after or simultaneously with the second data set.

The method 430 further comprises, as described in further detail below with reference to the example of FIG. 5, correlating 436 the first-motion-data with the second-motion-data to identify a relationship between the first-timing-information and the second-timing-information. The identified relationship between the first-timing-information and the second-timing-information defines one or more associations between the first-sensor-data and the second-sensor-data. The associations may be used to provide a combined dataset with one or more datum of first-sensor-data associated with a corresponding one or more datum of second-sensor-data.

In examples in which the method is applied to synchronizing sensor-data from a 3D-camera-device 302 and a sensor-device 304, such as that described previously with reference to FIG. 3, the first dataset described with reference to FIG. 4 relates to the 3D-camera dataset 321 of FIG. 3, and the second dataset described with reference to Figure relates to the sensor-dataset 341 of FIG. 3.

Figure 5:
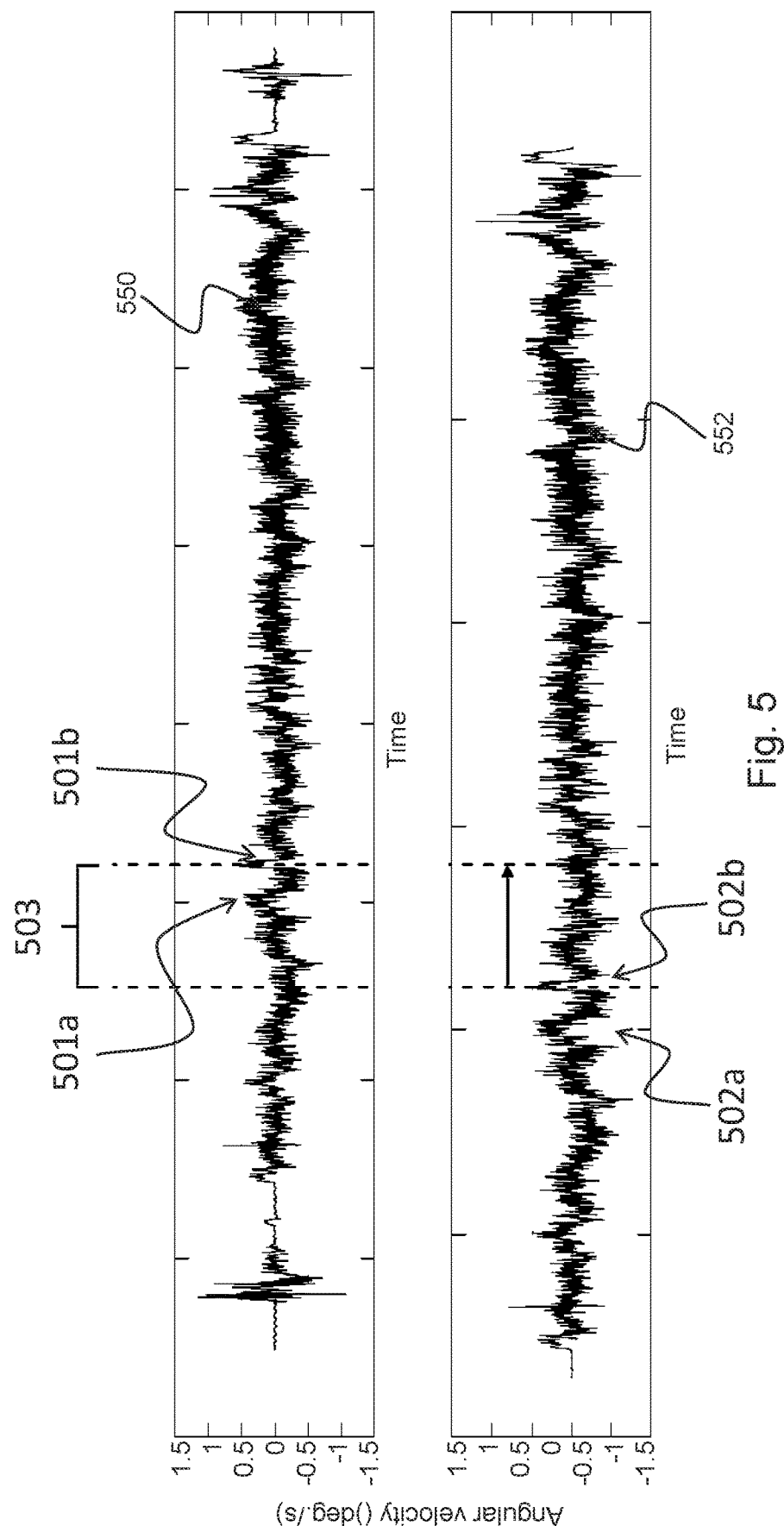
FIG. 5 illustrates example first-motion-data and example second-motion-data, each with corresponding example timing-information.

FIG. 5 illustrates data used in the step of correlating the first-motion-data with the second-motion-data to identify a relationship between the first-timing-information and second-timing-information. First-motion-data 550 is plotted as a function of time in the top graph and second-motion-data 552 is plotted as a function of time in the bottom graph.

In this example, the first-motion-data 550 and associated first-timing-information have been collected from a gyroscopic sensor on a first-device. Similarly, the second-motion-data 552 and associated second-timing-information have been collected from a gyroscopic sensor on a second device. The first-motion-data 550 and the second-motion-data 552 are each sets of angular rotation rate data in this example. The first device is physically attached to, or co-located with, the second device as discussed previously with reference to FIG. 2b, such that the angular rotation rate of both devices around the z-axis can be assumed to be the same during motion of both devices. In addition, the first-device and the second-device in this example share a common coordinate frame (the x, y and z axes are aligned with respect to the gyroscopic coordinate frame of both devices) to ease comparison of the first and first-motion-data 550 and the second motion-data 552. Given the relationship between the devices, rotation of the co-located first- and second-devices produces the same or similar rotation rate signatures in both devices.

In instances where one or more features 501a-b in the first-motion-data 550 have one or more respective similar features 502a-b of the second-motion-data 552, a time-offset 503 may be derived between the first-timing-information and the second-timing-information associated with the respective features 501a-b, 503a-b. In one example, deriving the time-offset 503 comprises iteratively adjusting a time difference between the first-timing-information and the second-timing-information associated with the first-motion-data 550 and the second-motion-data 552. This is akin to sliding the second-motion-data and its associated second-timing-information along the time axis to improve a correspondence between the one or more features 501a-b of the first-motion-data 550 and the similar one or more features 503a-b of the second-motion-data 552. This may be achieved by iteratively adjusting the first-timing-information or second-timing-information to improve a correspondence between the one or more features 501a-b of the first-motion-data 550 and the similar one or more features 503a-b of the second-motion-data 552 to improve an alignment, in the time domain, between the respective features 501a-b, 503a-b of the motion-data 550, 552. Signal processing techniques, such as cross-correlation, may be used to determine the relationship between the first-timing-information and the second timing-information based on the correspondence between features 501a-b, 503a-b of the first-motion data 550 and second-motion-data 552. Cross-correlation provides a measure of the similarity of two time-series datasets as a function of the time-offset shift between both datasets. In one example, the time offset 503 can be derived from the time difference when a mismatch between respective features is below a threshold, or minimized.

In one example, the first-timing-information may be shifted with respect to the second-timing-information in order to reduce a mismatch between corresponding first- and second-motion-data 550, 552. Alternatively, the second-timing-information may be shifted with respect to the first-timing-information in order to reduce a mismatch between corresponding first- and second-motion-data 550, 552. In a further example, both the first and second-timing-information may be transposed onto a common time-frame. The amount that the timing-information requires shifting in order to match the motion-data 550, 552 identifies a relationship between the first- and second-timing-information.

If the respective devices that collected the first-motion-data 550 and second-motion-data 552 also collected first-sensor-data and second-sensor-data that is also associated with the corresponding first-timing-information and second-timing-information, the identified relationship between the first-timing-information and the second-timing-information defines one or more associations between the first-sensor-data and the second-sensor data. In such cases a relationship is known between the timing-information of the respective sensor-data so that data that were captured at the same time are associated with one-another.

Synchronising the first-timing-information with the second-timing-information using the motion-data therefor provides one or more associations between the first-sensor-data and the second-sensor-data. As a result, second-sensor-data may be more readily matched with first-sensor data. For the case where the first-sensor-data corresponds to 3D-map-data, a datum of the second-sensor-data can be located within the 3D space defined by the 3D-map-data corresponding to the position at which the datum was captured. For example, a position of a SLAM device obtained when a particular feature 501a of the first-motion-data 550 occurred may be associated with a temperature reading obtained by a mobile telephone when the corresponding particular feature 503a of the second-motion-data 552 occurred.

The approach outlined above has been found to enable integration of a high-resolution panoramic camera, a range of smartphone devices (that enable capture of digital imagery, WiFi signal strength, note taking and increasing support for additional sensing devices) and single board computers (including Raspberry Pi™ and Nvidia Jetson Nano™ devices, which support a wide range of additional sensors) with 3D-data from a 10 SLAM device. In turn, this enables significant expansion of the mapping capability of the SLAM device without a requirement for direct hardware integration. Combined datasets provides by co-located devices using these approaches may provide sensor device inside a 3D-data map, for example.

The invention claimed is:

1. A computer readable storage medium comprising non-transitory computer program code configure to cause a processor to:
   receive first-sensor-data, first-motion-data and first-timing-information from a first-sensor-device, in which the first-timing-information is associated with the first-sensor-data and the first-motion-data;
   receive second-sensor-data, second-motion-data and second-timing-information from a second-sensor-device, in which the second-timing-information is associated with the second-sensor-data and the second-motion-data, the first-sensor-device and the second-sensor-device exhibiting similar motion; and
   determine a cross-correlation function of the first-motion-data and the second-motion-data to identify a time-offset between the first-timing-information and the second-timing-information, in which the identified time-offset between the first-timing-information and the second-timing-information defines one or more associations between the first-sensor-data and the second-sensor-data.

2. The computer readable storage medium of claim 1, in which:
   the first-sensor-device is a 3D-camera-device;
   the first-sensor-data is 3D-camera-data;
   the first-motion-data is camera-motion-data; and
   the first-timing-information is camera-timing-information.

3. The computer readable storage medium of claim 1, in which each of the first-motion-data and second-motion-data comprises acceleration-data.

4. The computer readable storage medium of claim 1, comprising establishing, based on the time-offset, a common time frame for the first-timing-information and the second-timing-information to synchronise the first-sensor-data with the second-sensor-data.

5. A method comprising:
   receiving first-sensor-data, first-motion-data and first-timing-information from a first-sensor-device, in which the first-timing-information is associated with the first-sensor-data and the first-motion-data;
   receiving second-sensor-data, second-motion-data and second-timing-information from a second-sensor-device, in which the second-timing-information is associated with the second-sensor-data and the second-motion-data; and
   determining a cross-correlation function of the first-motion-data and the second-motion-data to identify a time-offset between the first-timing-information and the second-timing-information, in which the identified time-offset between the first-timing-information and the second-timing-information defines one or more associations between the first-sensor-data and the second-sensor-data.

6. The method of claim 5, in which:
   the first-sensor-device is a 3D-camera-device;
   the first-sensor-data is 3D-camera-data;
   the first-motion-data is camera-motion-data; and
   the first-timing-information is camera-timing-information.

7. The method of claim 6, wherein the camera-motion-data, the camera-timing-information and 3D-map-data corresponding to the 3D-camera data are received from the 3D-camera-device and the second-sensor-data, second-motion-data and second-timing-information are received from the second-sensor-device.

8. The method of claim 6, wherein the 3D-camera-device is a simultaneous localisation and mapping, SLAM, device.

9. The method of claim 5, in which each of the first-motion-data and second-motion-data comprises acceleration-data.

10. The method of claim 5, comprising establishing, based on the time-offset, a common time frame for the first-timing-information and the second-timing-information to synchronise the first-sensor-data with the second-sensor-data.

11. The method of claim 5, wherein the second-sensor-data is one or more of the following: imaging-sensor-data, radio-frequency, RF-sensor-data, gas-sensors-data and temperature-sensor-data.

12. The method of claim 5, comprising generating a combined dataset having the second-sensor-data and corresponding 3D-map-data with common timing information.

13. The method of claim 5, wherein the second-sensor-device is co-located with the 3D-camera-device.

14. A simultaneous localisation and mapping, SLAM, device comprising:
   a first-sensor-device configured to generate first-sensor-data, first-motion-data and first-timing-information, in which the first-timing-information is associated with the first-sensor-data and the first-motion-data; and
   a data processing unit including at least one processor and a memory, and configured to:
      receive the first-sensor-data, first-motion-data and first-timing-information from the first-sensor-device;
      receive second-sensor-data, second-motion-data and second-timing-information from a second-sensor-device, in which the second-timing-information is associated with the second-sensor-data and the second-motion-data; and
      determine a cross-correlation function of the first-motion-data and the second-motion-data to identify a time-offset between the first-timing-information and the second-timing-information, in which the identified time-offset between the first-timing-information and the second-timing-information defines one or more associations between the first-sensor-data and the second-sensor-data.

15. The SLAM device of claim 14 further comprising the second-sensor-device.

16. The SLAM device of claim 14 further configured to be co-located with the second-sensor-device by physically attaching the second-sensor-device to the SLAM device.

* * * * *